United States Patent
Cher et al.

(10) Patent No.: US 10,528,097 B2
(45) Date of Patent: Jan. 7, 2020

(54) CHIP TRANSIENT TEMPERATURE PREDICTOR

(71) Applicant: INTERNATIONAL BUSINESS MACHINES CORPORATION, Armonk, NY (US)

(72) Inventors: Chen-Yong Cher, Port Chester, NY (US); Haifeng Qian, Mount Kisco, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 496 days.

(21) Appl. No.: 15/066,761

(22) Filed: Mar. 10, 2016

(65) Prior Publication Data
US 2017/0261380 A1    Sep. 14, 2017

(51) Int. Cl.
G06F 1/20    (2006.01)
G01K 7/42    (2006.01)

(52) U.S. Cl.
CPC ............... G06F 1/206 (2013.01); G01K 7/42 (2013.01)

(58) Field of Classification Search
CPC ....................................................... G06F 1/206
See application file for complete search history.

(56) References Cited

U.S. PATENT DOCUMENTS

| | | | | |
|---|---|---|---|---|
| 6,470,289 B1 * | 10/2002 | Peters | ............. | G01K 7/42 702/132 |
| 2005/0120252 A1 * | 6/2005 | Uwatoko | ............. | G06F 1/206 713/300 |
| 2009/0064164 A1 | 3/2009 | Bose et al. | | |
| 2011/0301777 A1 | 12/2011 | Cox et al. | | |
| 2013/0166885 A1 | 6/2013 | Ramani et al. | | |
| 2015/0103866 A1 | 4/2015 | Samadi et al. | | |
| 2015/0286262 A1 | 10/2015 | Park et al. | | |

FOREIGN PATENT DOCUMENTS

| | | |
|---|---|---|
| EP | 0872345 | 10/1998 |
| WO | 2006/008215 | 1/2006 |
| WO | 2007/024403 | 3/2007 |

OTHER PUBLICATIONS

Inchoon Yeo, et al., "Predictive Dynamic Thermal Management for Multicore Systems", DAC 2008, Jun. 8-13, 2008, Anaheim, California,USA, pp. 734-739.
Bagher Salami, et al., "Physical-Aware Task Migration Algorithm for Dynamic Thermal Management of SMT Multi-Core Processors", Presented at ASP-DAC 2014, pp. 292-297.
Dan Upton, et al., "Evaluating Linear Regression for Temperature Modeling at the Core Level", In Workshop on Duplication, Deconstructing, and Debunking, pp. 8-14, San Jose, CA, Jun. 2011, pp. 1-7.

* cited by examiner

*Primary Examiner* — Yu-Hsi D Sun
(74) *Attorney, Agent, or Firm* — F. Chau & Associates, LLC

(57) ABSTRACT

An integrated circuit (IC) includes: a plurality of hardware performance counters; a thermal sensor; and a micro-controller. The micro-controller generates a plurality of thermal predictors based on values of the counters and temperatures sensed by the thermal sensor. The thermal predictors include first and second rising thermal delta predictors to predict rising temperature deltas and first and second falling thermal delta predictors to predict falling temperature deltas. The micro-controller predicts a future temperature of the IC based on an idle temperature of the IC and a selected one of the temperature deltas.

20 Claims, 10 Drawing Sheets

CHIP TRANSIENT TEMPERATURE PREDICTOR

STATEMENT REGARDING FEDERALLY SPONSORED RESEARCH OR DEVELOPMENT

This invention was made with Government support under Contract No.: HR0011-13-C-0022 awarded by Defense Advanced Research Projects Agency (DARPA). The Government has certain rights in this invention.

BACKGROUND

An integrated circuit (IC) is a set of electronic circuits on one small plate ("chip") of semiconductor material. ICs can be made much smaller than a discrete circuit, which is made from independent electronic components. ICs can be made very compact, having up to several billion transistors and other electronic components in a very small area. As an example, a single chip can house an entire Central Processing Unit (CPU).

The temperature of a chip housing a CPU may rise when instructions are executed by the CPU. However, if the temperature of the chip rises to high, it may cause components of the chip to temporarily malfunction or permanently fail.

Thus, there is a need for a chip that can better protect itself against temporary malfunction and permanent failures due to an excessive operating temperature.

SUMMARY

According to an exemplary embodiment of the invention, an integrated circuit (IC) includes: a plurality of hardware performance counters; a thermal sensor; and a micro-controller. The micro-controller generates a plurality of thermal predictors based on values of the counters and temperatures sensed by the thermal sensor. The thermal predictors include first and second rising thermal delta predictors to predict rising temperature deltas and first and second falling thermal delta predictors to predict falling temperature deltas. The micro-controller predicts a future temperature of the IC based on an idle temperature of the IC and a selected one of the temperature deltas.

According to an exemplary embodiment of the invention, a method of predicting a future temperature within an integrated circuit (IC) includes: generating, first and second rising thermal delta predictors, based on values of hardware counters of the IC and temperatures sensed by a thermal sensor within the IC, to predict rising temperature deltas; generating, first and second falling thermal delta predictors, based on values of hardware counters of the IC and temperatures sensed by the thermal sensor within the IC, to predict falling temperature deltas; and generating the future temperature based on an idle temperature of the IC and a selected one of the temperature deltas.

BRIEF DESCRIPTION OF THE SEVERAL VIEWS OF THE DRAWINGS

The accompanying drawings, which are incorporated herein and form part of the specification, illustrate the present invention and together with the description, further serve to explain the principles of the invention and to enable a person skilled in the pertinent art to make and use the invention.

DETAILED DESCRIPTION

Figure 1:
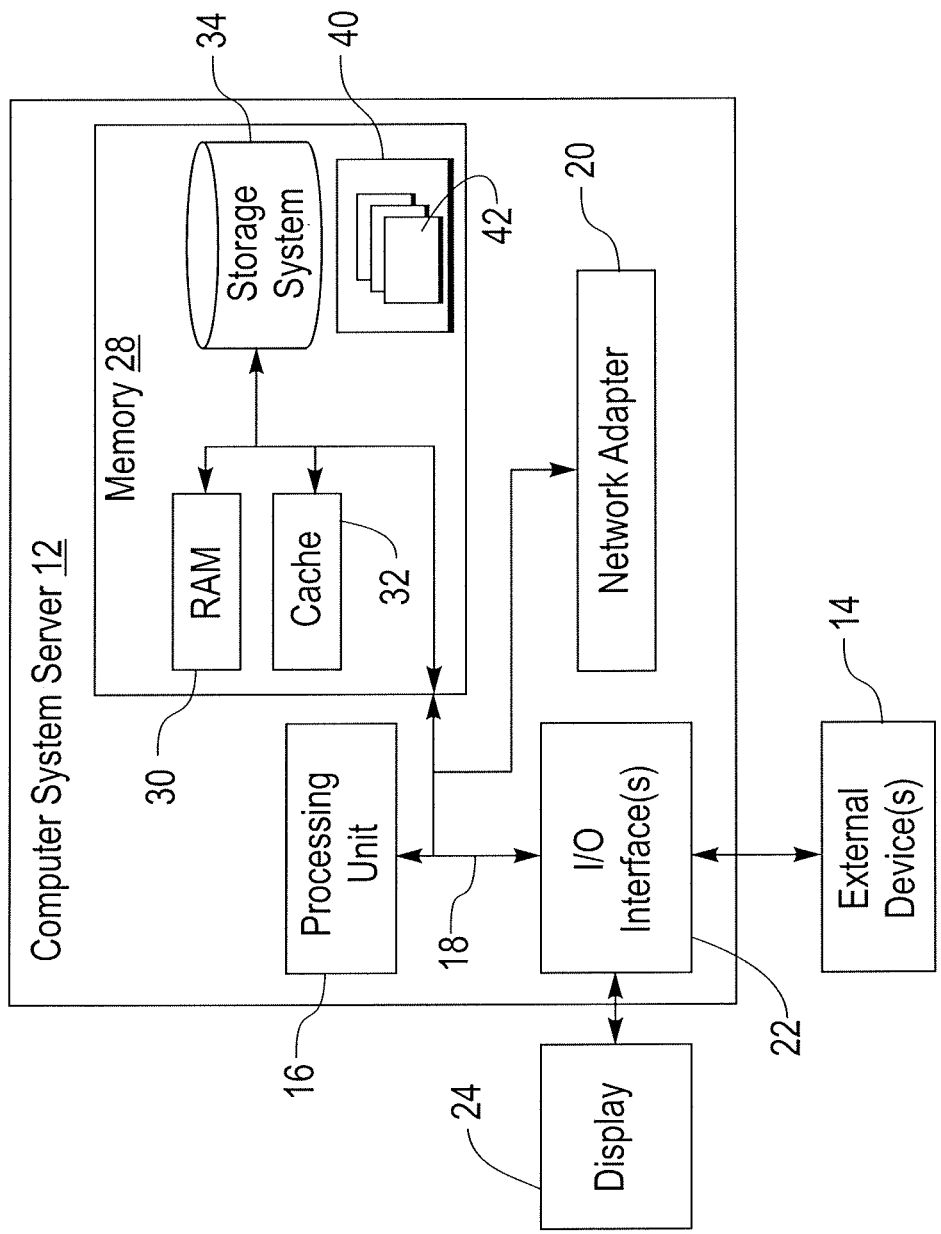
FIG. 1 is a schematic block diagram block diagram illustrating a computer system, which may house an exemplary embodiment of the invention.

The inventive concept will be described in more detail with reference to the accompanying drawings, where exemplary embodiments of the present disclosure have been illustrated. Throughout the drawings, same or like reference numerals are used to represent the same or like components. However, the present inventive concept can be implemented in various manners, and thus should not be construed to be limited to the embodiments disclosed herein. On the contrary, those embodiments are provided for the thorough and complete understanding of the present disclosure to convey the scope of the present disclosure to those skilled in the art.

FIG. 1 illustrates an exemplary computer system/server 12, which may house a processing unit according to embodiments of the present invention. The computer system/server 12 is only illustrative and is not intended to suggest any limitation as to the scope of use or functionality of embodiments of the invention described herein.

As shown in FIG. 1, the computer system/server 12 is shown in the form of a general-purpose computing device. The components of the computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

The computer system/server 12 may include a variety of computer system readable media. Such media may be any available media that is accessible by the computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/non-volatile computer system storage media. By way of example, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules.

A program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. The computer system/server 12 can communicate with one or more networks such as a local area network (LAN), a general wide area network (WAN), and/or a public network (e.g., the Internet) via a network adapter 20. As depicted, the network adapter 20 communicates with the other components of computer system/server 12 via the bus 18. It should be understood that although not shown, other hardware and/or software components could be used in conjunction with the computer system/server 12. Examples of these other hardware and/or software components include, but are not limited to: microcode, device drivers, redundant processing units, external disk drive arrays, RAID systems, tape drives, and data archival storage systems.

Figure 2:
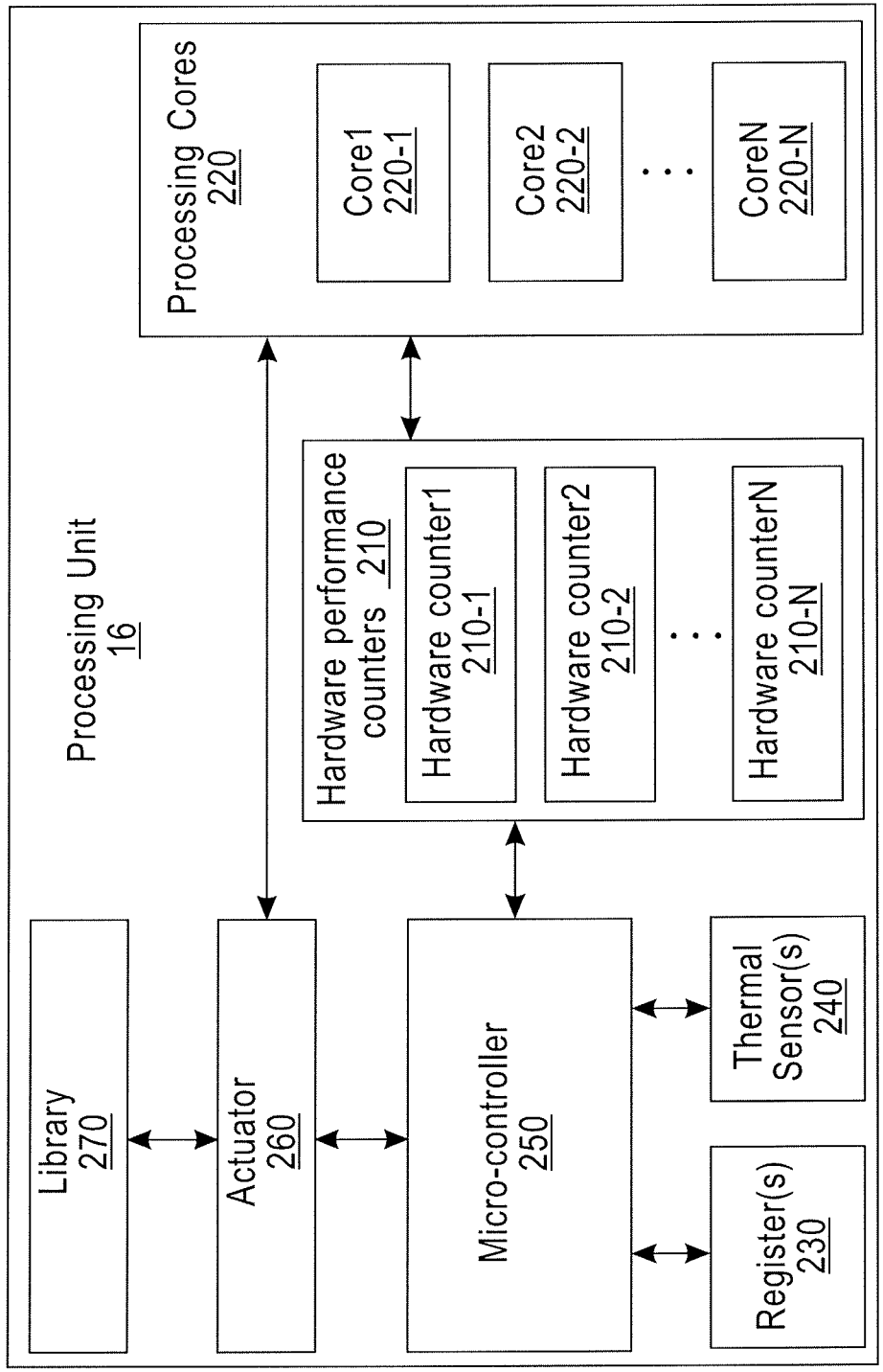
FIG. 2 illustrates a processing unit (e.g., a CPU) of the computer system according to an exemplary embodiment of the invention.

FIG. 2 illustrates the processing unit 16 of FIG. 1 according to an exemplary embodiment of the inventive concept. While FIG. 1 illustrates that the processing unit 16 is part of a computer server 12, the invention is not limited thereto. For example, the processing unit 16 may part of a system on chip. The processing unit 16 is an integrated circuit (e.g., a chip). The processing unit 16 includes one or more hardware performance counters 210, one or more thermal sensors 240, and a micro-controller 250. The processing unit 16 may include one or more processing cores 220, one or more registers 230, an actuator 260, and a task library 270. The processing unit 16 may additionally include one or more volatile or nonvolatile memories, which may be formatted as one or more caches.

The thermal sensors 240 may be located in close proximity to respective cores 220-1, 220-2, . . . , 220-N. For example, a first one of the thermal sensors 240 may be located near or in contact with the first core 220-1 to detect a current temperature of the first core 220-1, a second one of the thermal sensors 240 may be located near or in contact with the second core 220-2 to detect a current temperature of the second core 220-2, etc. In an embodiment, the thermal sensors 240 are one of an on-chip ring oscillator or oscillator-based temperature sensor, an on-chip biased current generator, a thermocouple, a resistance thermometer, and a silicon bandgap temperature sensor. While a plurality of thermal sensors 240 are illustrated in FIG. 2, in an alternate embodiment, only a single thermal sensor is present. In an embodiment, the thermal sensors 240 are located outside the processing unit 16.

The hardware performance counters 210 include a plurality of hardware counters 210-1, 210-2, . . . , 210-N. In an embodiment, the hardware counters (also referred to as activity counters) are a set of special-purpose registers built into the processing unit 16, the micro-controller 250, or one or more of the cores 220 to store the counts of hardware-related activities. Compared to software profilers, hardware counters provide low-overhead access to a wealth of detail performance information related to a CPU's or a processing core's functional units, caches, and main memory. The hardware counters may include distinct counters to count the number of floating-point unit (FPU) operations performed (e.g., a dispatched floating point unit operations counter), an FPU utilization, the number of reads performed, the number of writes performed, the number of data cache accesses, the number of data cache misses, the number of data cache lines evicted, the number of memory requests (e.g., to non-cacheable memory, to write-combining (WC) memory, etc.), the number of data pre-fetches, number of requests to cache, number of instruction cache fetches, number of instruction cache misses, respectively. Please note that the precise number of hardware counters and their type varies based on the type of processor used. Thus, the invention is not limited to the above listed hardware counters.

The micro-controller 250 (e.g., a microprocessor) operates on the temperature data received from one or more of the thermal sensors 240 to predict a temperature of the processing unit 16 or one or more of the processing cores 220 or a single CPU in an embodiment where the multiple processing cores 220 are replaced with a single core or CPU. If the predicted temperature exceeds a safe operating temperature, the micro-controller 250 can perform an action to reduce the current temperature or prevent the current temperature from reaching the predicted temperature.

In an exemplary embodiment, prediction of a Predicted Temperature 450 (e.g., a future temperature) requires the micro-controller 250 to first generate Thermal Predictors 420 based on temperature data received from one or more of the thermal sensors 240 and counts received from one or more of the hardware performance counters 210. The processing unit 16 may be operated in a test mode or operated on a test program while the Thermal Predictors 420 are being generated.

Figure 3:
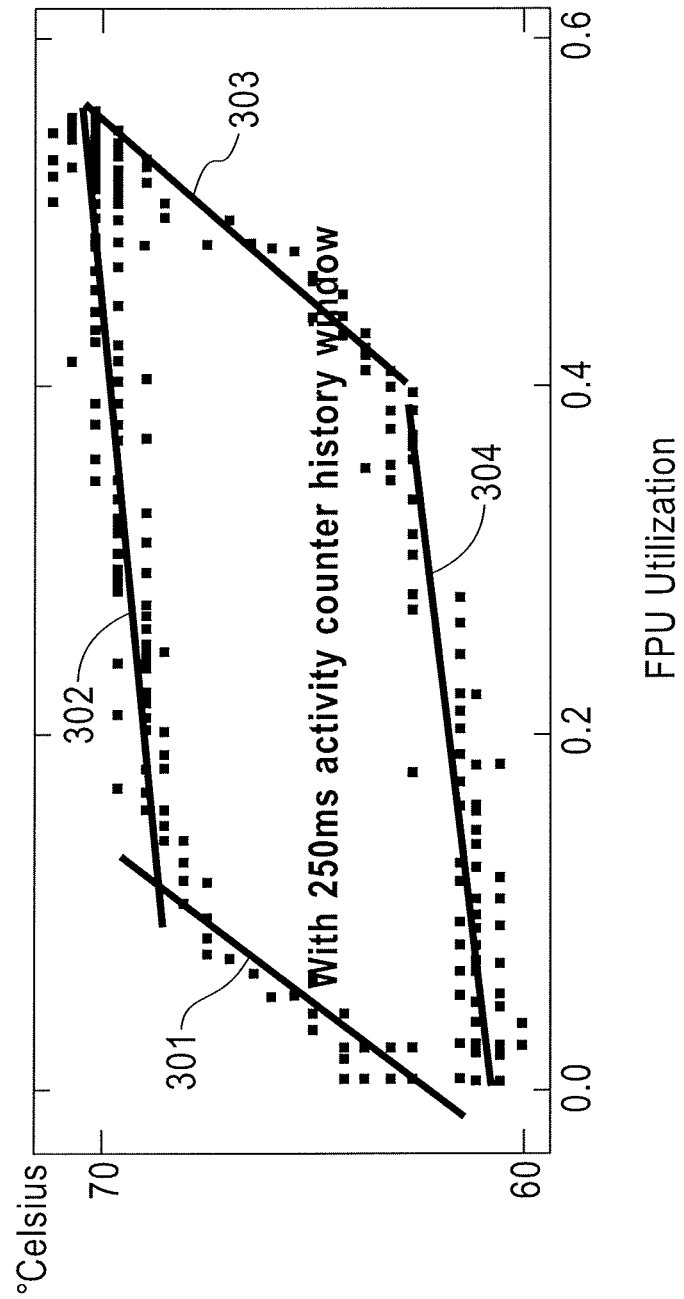
FIG. 3 illustrates a sample plot for describing derivation of thermal delta predictors used in embodiments of the invention.

FIG. 3 is an example of points plotted based on temperature and counter data collected during the test mode. In this example, data from only a single one of the hardware performance counters 210 is used. In this example, the single hardware performance counter provides a count of the current utilization level of a FPU located within the processing unit 16, within one of the cores 220, or located within a single CPU when the cores 220 are replaced by a single CPU. In this example, the temperature and FPU utilizations are sampled periodically at a time window of every 250 ms. However, the invention is not limited thereto. Further, the time window need not be 250 ms, and may be vary in alternate embodiments. The size of the time window may be stored in one of registers 230. Each sampled temperature and FPU utilization pair is then plotted as a point on the graph shown in FIG. 3. Linear regression is then performed on the points to determine a first line 301 of a first slope, a second line 302 of a second slope, a third line 303 of a third slope, and a fourth line 304 of a fourth slope.

The first and second lines 301 and 302 are indicative of a rising temperature. The first line 301 may used to generate the first Rising Thermal Delta Predictor 421. The second line 302 may be used to generate the second Rising Thermal Delta Predictor 422. The slope of the first line 301 is typically fairly steep as compared to the slope of the second line 302. The slopes of the first and second lines 301 and 302 may be considered positive slopes because they indicate rising temperatures. The magnitude of the slope of the first line 301 is higher than the magnitude of the slope of the second line 302.

The third and fourth lines 303 and 304 are indicative of a falling temperature. The third line 303 may used to generate the first Falling Thermal Delta Predictor 423. The fourth line 304 may be used to generate the second Falling Thermal Delta Predictor 424. The slope of the third line 303 is fairly steep as compared to the slope of the fourth line 304. The slopes of the third and fourth lines 303 and 304 may be considered negative slopes because they indicate falling temperatures. The magnitude of the slope of the third line 303 is higher than the magnitude of the slope of the fourth line 304.

Figure 4:
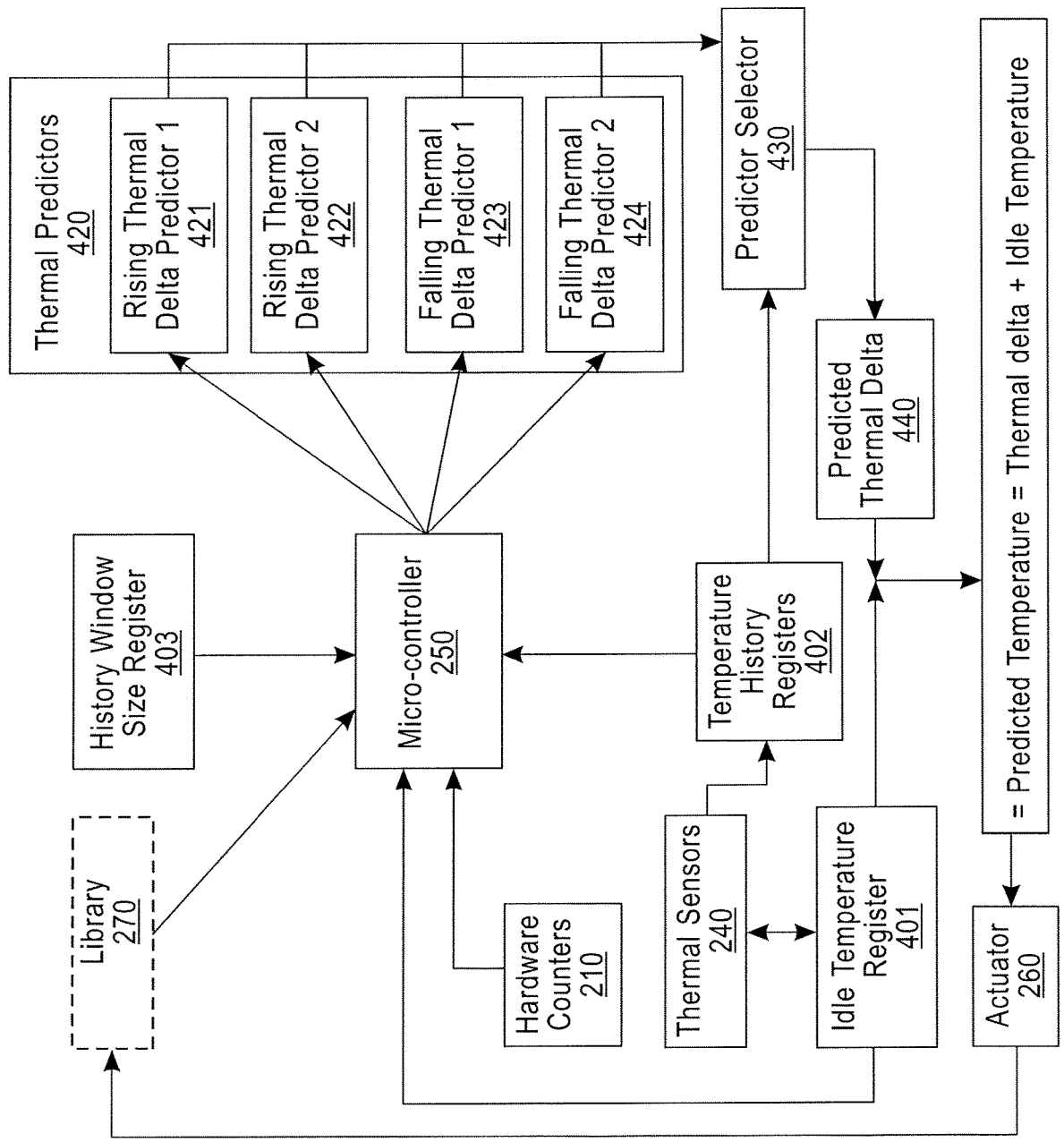
FIG. 4 illustrates a system diagram including a micro-controller of the processing unit according to an exemplary embodiment of the invention.

FIG. 4 is a system diagram showing an interaction of the micro-controller 250 with elements of the processing unit 16 to generate the Thermal Predictors 420 and a Predicted Temperature 450, according to an exemplary embodiment of the invention. The micro-controller 250 uses outputs of one or more of the hardware counters 210 to generate an aggregate count and applies the aggregate count to each if the Thermal Predictors 420, to generate four temperature deltas, one associated with each of the Thermal Predictors 420. The predictor selector 430 (e.g., logic of the micro-controller 250) selects one of the four temperature deltas using data it receives from one or more temperature history registers 402 as the Predicted Thermal Delta 440. The Predicted Temperature 450 is a sum of the Predicted Thermal data 440 and an Idle Temperature, which may be stored in an Idle Temperature Register 401. The Idle Temperature may be the temperature of the processing unit 16 when the processing unit 16 is idle or an ambient temperature. For example, the ambient temperature may be the temperature of the surrounding environment, which may be sensed from a temperature sensor 240 located outside the processing unit 16. For example, if the idle temperature is 60° C., and the Predicted Thermal Delta is 5° C., then the Predicted Temperature 450 is 65° C. The temperature history registers 402 and/or the idle temperature register 401 may be registers located in registers 230 of FIG. 2.

If the Predicted Temperature 450 is too high (e.g., exceeds a pre-defined threshold temperature stored in a one of registers 230), the actuator 260 (e.g., logic of the micro-controller 250 or a separate micro-controller or on-chip micro-controller) can throttle the processing unit 16 or one or more of the cores 220, perform task migration/swapping, task priority adjustments, or adjust the schedules of tasks. For example, the actuator 260 could perform the throttling by reducing the operating frequency of the processing unit 16 or one or more of the cores 220. In an embodiment, the actuator 260 is a mechanism (e.g., relay, switch, motor, etc.) that is used to control the speed of a fan that is angled to direct air at the processing unit 16 or control a thermoelectric cooling device for the purpose of cooling the processing unit 16. For example, the actuator 260 can increase the speed of the fan from a current lower speed to a higher speed when the Predicted Temperature 450 exceeds the pre-defined threshold and return the speed to the previous lower speed when the Predicted Temperature 450 is below or at the pre-defined threshold. In an embodiment, the thermoelectric cooling device is a Peltier device, a Peltier heat pump, a solid state refrigerator, or a thermoelectric cooler (TEC). For example, the actuator 260 can increase the operational current level of thermoelectric cooling device from a lower current level to a higher current level when the Predicted Temperature 450 exceeds the pre-defined threshold and return the operational current level to the previous lower current level when the Predicted Temperature 450 is below or at the pre-defined threshold. In an embodiment, actuator 260 is a mechanism to control the temperature of a liquid coolant in a liquid cooling system that can be used to cool the processing unit 16. For example, the actuator 260 can decrease the coolant temperature from a higher temperature to a lower temperature when the Predicted Temperature 450 exceeds the pre-defined threshold and return the coolant temperature to the previous lower temperature level when the Predicted Temperature 450 is below or at the pre-defined threshold. The actuator 260 can use information stored in the library 270 to adjust how tasks are executed when the Predicted Temperature 450 is too high. For example, if the processing unit 16 has currently assigned a first amount of run time to a first task and assigned a second amount of run time to a second task, and the library 270 indicates that the first task is considered a hot task (e.g., a task that increases the temperature more than most tasks) and the second task is considered a cold task (e.g., a task that only nominally increases the temperature), the actuator 260 can reduce the first amount of time and/or increase the second amount of time. If the library 270 indicates the first core 220-1 is a hot core (e.g., a core that typically has a significantly higher operating temperature than other cores) and a second core 220-2 is cold core (e.g., a core that typically has a lower operating temperature than other cores), the actuator 260 can migrate tasks from the first code 220-1 to the second core 220-2. In an embodiment, the Library 270 is stored in a memory of the processing unit 16.

Figure 5:
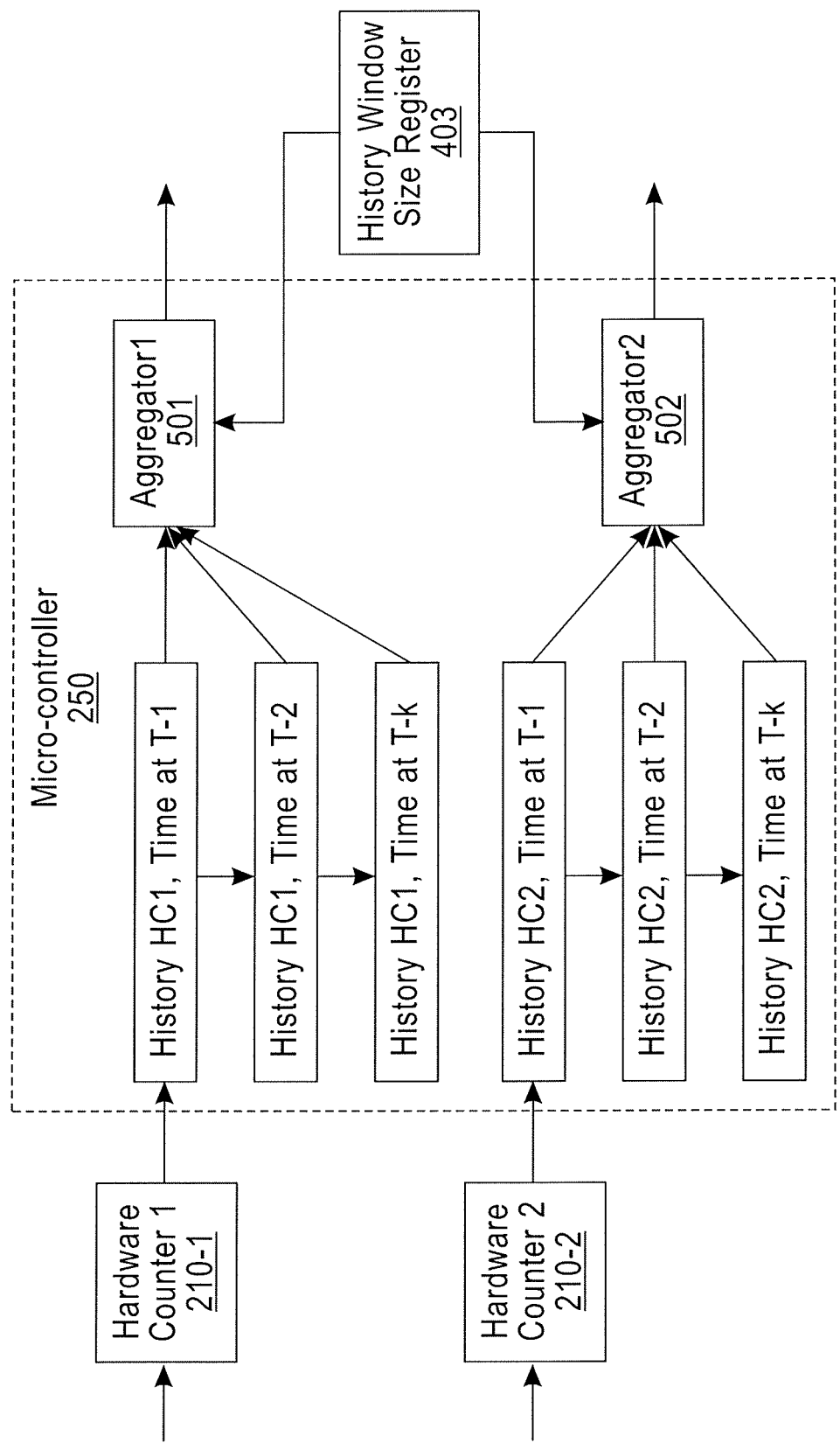
FIG. 5 illustrates an operation of the micro-controller according to an exemplary embodiment of the invention.
Figure 6:
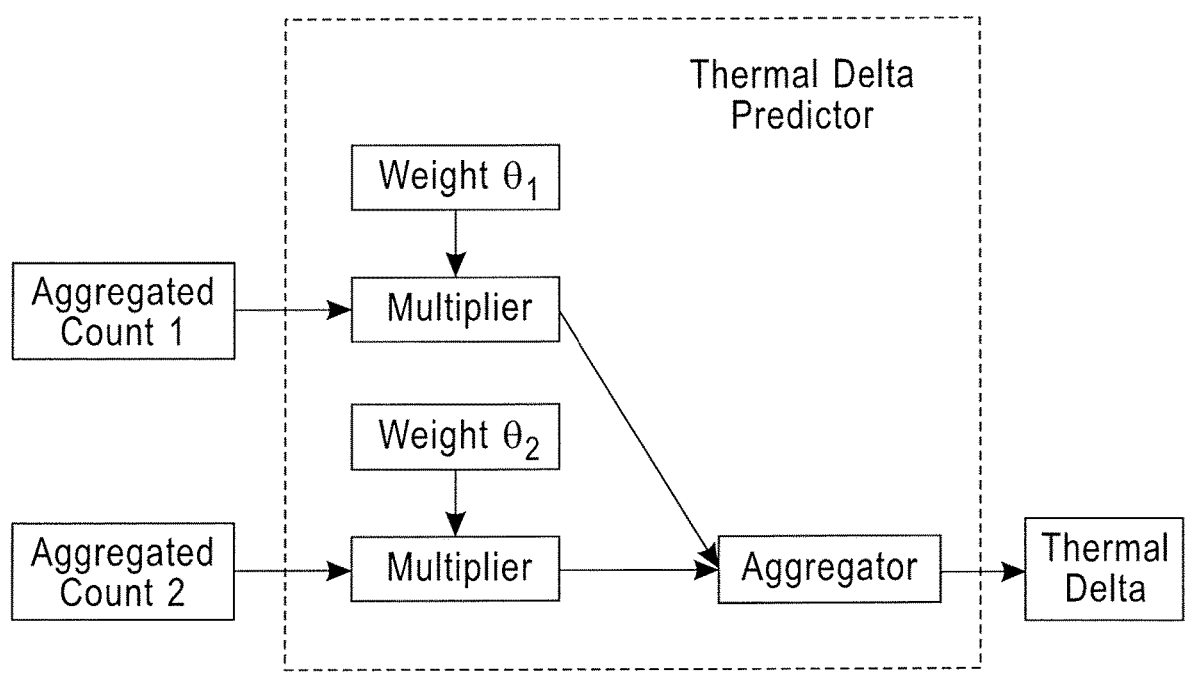
FIG. 6 illustrates a configuration of a thermal delta predictor according to an exemplary embodiment of the invention.

FIG. 5 illustrates an operation being performed by the micro-controller 250 to generate aggregate counts to be applied to one of the thermal predictors illustrated in FIG. 6. In this example, two hardware counters 210-1 and 210-2 are used. For convenience of explanation, it will be assumed that the first hardware counter 210-1 counts floating-point operations performed and the second hardware counter 210-1 counts requests to a cache. The micro-controller 250 periodically samples the hardware counters 210. For example, if the period is 250 ms, then every 250 ms, the micro-controller 250 stores a new value of each of the hardware counters. For example, at times 0, 250, 500, and 750, the micro-controller 250 might record that 5, 7, 3, and 2 floating-point operations have been performed, respectively, and record that 3, 6, 2, and 8 requests to the cache have been performed, respectively. A first aggregator 501

(e.g., logic of the micro-controller 250 or a separate adder circuit) sums a certain number of the most recently recorded data of the first hardware counter 210-1 based on a value stored in the history window size register 403 to generate a first sum (e.g., see Aggregated Count1 in FIG. 6), and a second aggregator 502 (e.g., logic of the micro-controller 250 or a separate adder circuit) sums the same number of the most recently recorded data of the second hardware counter 210-2 based on the same value to generate a second sum (e.g., see Aggregated Count2 in FIG. 6). For example, if the value indicates a window size of 500 ms, then the first sum would be a sum of 7, 3, and 2 and the second sum would be a sum of 6, 2, and 8, since they were sampled within the last 500 ms.

FIG. 6 illustrates one of the Thermal Delta Predictors 420, according to an exemplary embodiment of the invention. The thermal delta predictor multiplies the first sum (e.g., Aggregated Count1) by a first weight $\theta_1$ to generate a first value, multiplies the second sum by a second weight $\theta_2$ to generate a second value, and an aggregator (e.g., logic of the micro-controller 250 or a separate adder circuit) of the predictor sums the values to generate a thermal delta. The thermal predictor may perform the above-described multiplications using a mixer or a multiplier. The values of the weights differ based on whether the thermal delta predictor is the first Rising Thermal Delta Predictor 421, the second Rising Thermal Delta Predictor 422, the first Falling Thermal Delta Predictor 423, or the second Falling Thermal Delta Predictor 424. While FIG. 6 shows use of only 2 aggregated counts, the invention is not limited there to. For example, a thermal delta predictor may consider counts from additional hardware performance counters. When additional hardware performance counters are used, the corresponding aggregated counts of the additional hardware performance counters are multiplied by corresponding additional weights and summed with the other multiplied results to generate the Thermal Delta.

Figure 7:
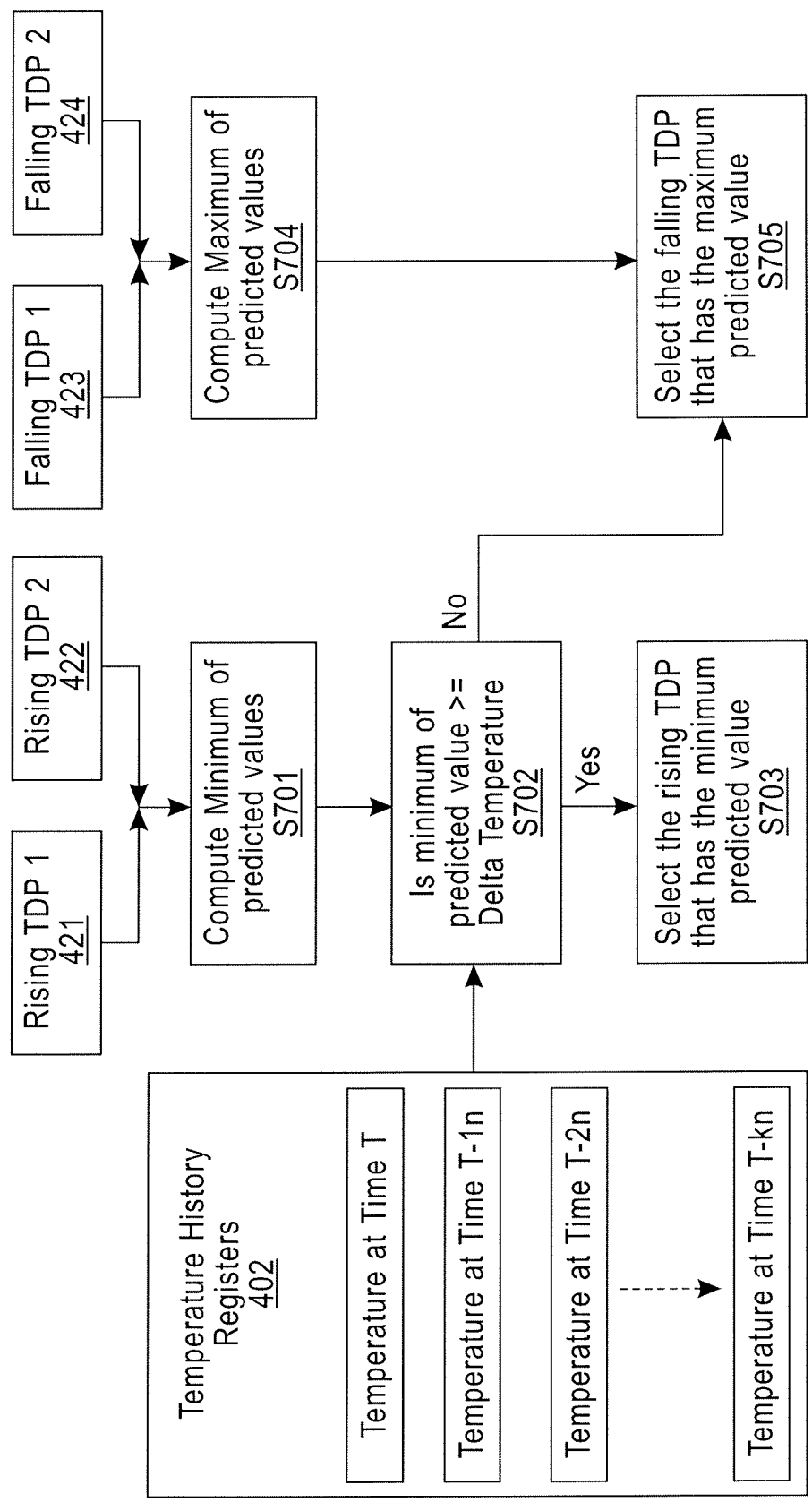
FIG. 7 illustrates a method of selecting one of the thermal delta predictors according to an exemplary embodiment of the invention.

FIG. 7 illustrates a method of the Predictor Selector 430 selecting one of the thermal deltas generated by the Thermal Predictors 420 to arrive at the Predicted Thermal Delta 440, according to an exemplary embodiment of the invention. It is assumed that the aggregate counts of the hardware counters 210 have already been applied to each of the Thermal Delta Predictors (TDP) 420, and accordingly, each thermal delta predictor has already generated its respective thermal delta.

The method then includes computing the minimum of the predicted values among the thermal deltas generating by the Rising Thermal Delta Predictors 421 and 422 (S701). For example, if the first Rising Thermal Delta Predictor 421 has generated a thermal delta of 5° C. and the second Rising Thermal Delta Predictor 422 has generated a thermal delta of 9° C., the minimum value would be 5° C. Next, the method determines whether the minimum value is greater than or equal to a most recently recorded temperature difference (e.g., Delta Temperature) (S702). For example, if the previously recorded temperature T−1n is 60° C. and the currently recorded temperature T is 63° C., then the minimum value of 5° C. is greater than the temperature difference of 3° C. (e.g., the Delta Temperature). Accordingly, the method would select the rising thermal delta predictor that has the minimum predicted value (S703). In this example, the method would have selected the first Rising Thermal Delta predictor 421, and accordingly, the Predicted Thermal Data 440 would be 5° C. For example, if the idle temperature is 60° C., then the Predicted Temperature 450 would be 65° C.

The method also includes computing the maximum of the predicted values of the falling thermal delta predictors (S704). This step may not occur if step S702 already determined that the minimum value of the rising thermal delta predictors 421 and 422 is greater than or equal to the Delta Temperature. If the first Falling Thermal Delta Predictor 423 predicted a thermal delta of 2° C. and the second Falling Thermal Delta Predictor 424 predicted a thermal delta of 3° C., then the maximum value would be 3° C. If the minimum value predicted by the rising thermal delta predictors is less than the Delta Temperature, then the method selects the falling thermal delta predictor that has the maximum predicted value (S705). For example, if the Delta Temperature had instead been 6° C., the second Falling Thermal Delta Predictor 424 would be selected, and accordingly, the Predicted Thermal Delta 440 would be 3° C. For example, if the idle temperature is 60° C., then the Predicted Temperature 450 would be 63° C.

Figure 8:
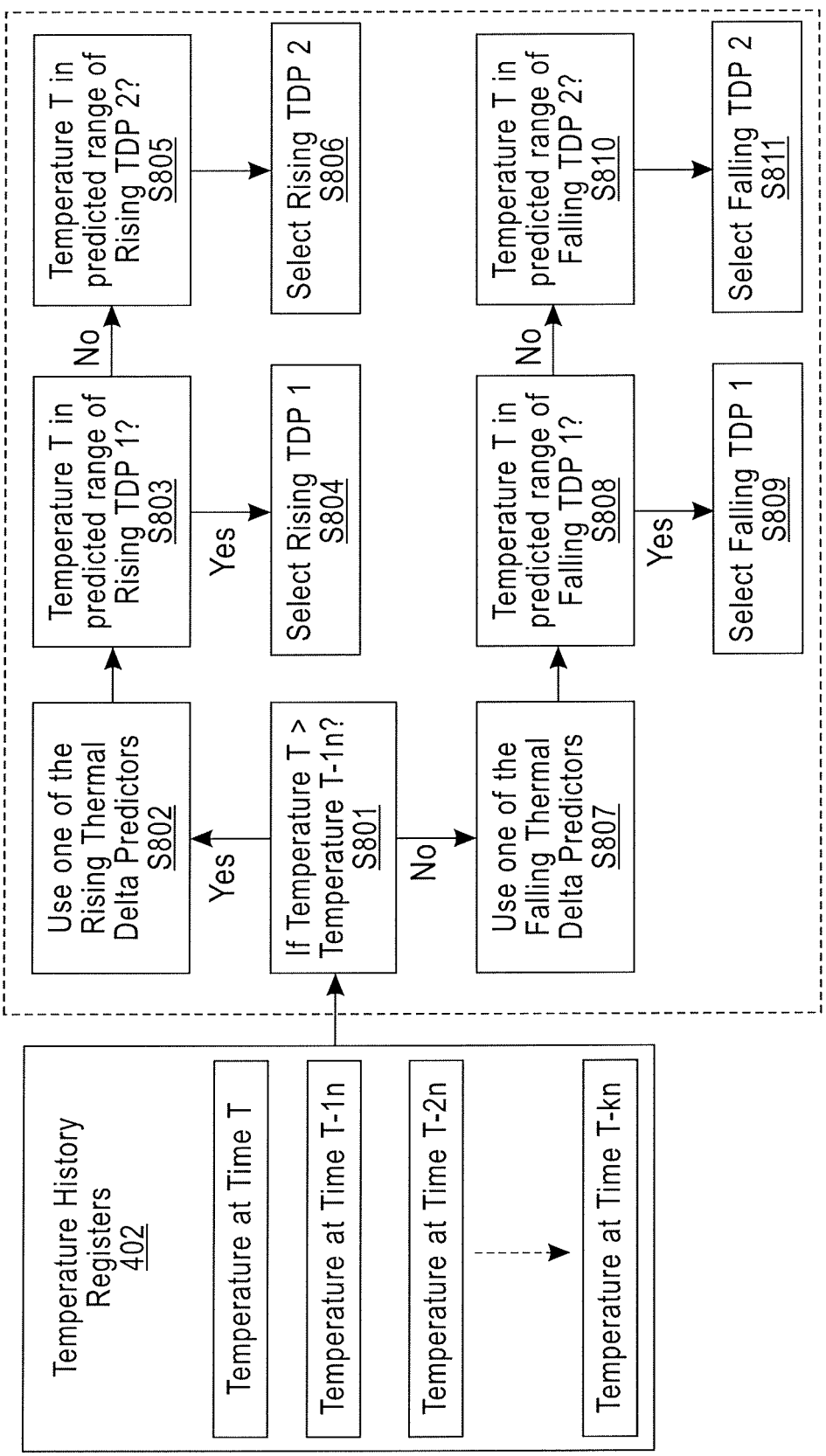
FIG. 8 illustrates a method of selecting one of the thermal delta predictors according to an exemplary embodiment of the invention.

FIG. 8 illustrates a method of the Predictor Selector 430 selecting one of the thermal deltas to arrive at the Predicted Thermal Delta 440, according to an exemplary embodiment of the invention. Is it assumed that the aggregate counts of the hardware counters 210 have already been applied to each of the Thermal Predictors (TDP) 420, and accordingly, each thermal delta predictor has already generated its respective thermal delta. It is also assumed that each of the Thermal Predictors 420 is associated with a particular temperature range. The first Rising Thermal Delta Predictor 421 is associated with a first temperature range and the second Rising Thermal Delta Predictor 422 is associated with a second temperature range that differs from the first temperature range. In an embodiment, the first temperature range does not overlap with the second temperature range. The first Falling Thermal Delta Predictor 423 is associated with a third temperature range and the second Falling Thermal Delta Predictor 424 is associated with a fourth temperature range that differs from the third temperature range. In an embodiment, the third temperature range does not overlap with the fourth temperature range. The method determines whether the current temperature T is less than the previous temperature T−1n (S801). One or more of the Thermal Sensors 240 stores a history of the temperatures including the current temperature T and the previous temperature T−1n in the temperature history registers 402, which may be located in registers 230.

If the Current Temperature T is greater than the Previous Temperature T−1n, the method decides to use one of the Rising Thermal Delta Predictors 421 and 422 (S802). Then, the method determines whether the Current Temperature T is within the first temperature range of the first Rising Thermal Delta Predictor 421 (S803). If the Current Temperature T is within the first temperature range, the method selects the first Rising Thermal Delta Predictor 421 (S804). If the Current Temperature T is not within the first temperature range, the method determines whether the current temperature T is within the second temperature range of the second Rising Thermal Delta Predictor 422 (S805). If the current temperature T is within the second temperature range, the method selects the second Rising Thermal Delta Predictor 422 (S806). For example, if the previous temperature T−1n is 64° C., the current temperature T is 65° C., the first temperature range is 63-68° C., the second temperature range is 68-72° C., the first Rising Thermal Delta Predictor 421 predicts an increase of 5° C., the second Rising Thermal Delta Predictor 422 predicts an increase of 6° C., then the first Rising Thermal Delta Predictor 421 would be selected, and accordingly, the Predicted Thermal Delta 440 would be 5° C. For example, if the idle temperature is 60° C., then the Predicted Temperature 450 would be 65° C.

If the Current Temperature T is less than the Previous Temperature T−1n, the method decides to use one of the Falling Thermal Delta Predictors 423 and 424 (S807). Then, the method determines whether the Current Temperature T is within the third temperature range of the second Rising Thermal Delta Predictor 423 (S808). If the Current Temperature T is within the third temperature range, the method selects the first Falling Thermal Delta Predictor 423 (S809). If the Current Temperature T is not within the third temperature range, the method determines whether the Current Temperature T is within the fourth temperature range of the second Falling Thermal Delta Predictor 424 (S810). If the Current Temperature T is within the fourth temperature range, the method selects the second Falling Thermal Delta Predictor 424 (S811). For example, if the Previous Temperature T−1n is 65° C., the current temperature T is 64° C., the third temperature range is 68-72° C., the fourth temperature range is 63-68° C., the second Falling Thermal Delta Predictor 424 predicts a thermal delta of 2° C., the first Falling Thermal Delta Predictor 423 predicts a thermal delta of 3° C., then the second Falling Thermal Delta Predictor 424 would be selected, and accordingly, the Predicted Thermal Delta 440 would be 2° C. For example, if the idle temperature is 60° C., then the Predicted Temperature 450 would be 62° C.

Figure 9:
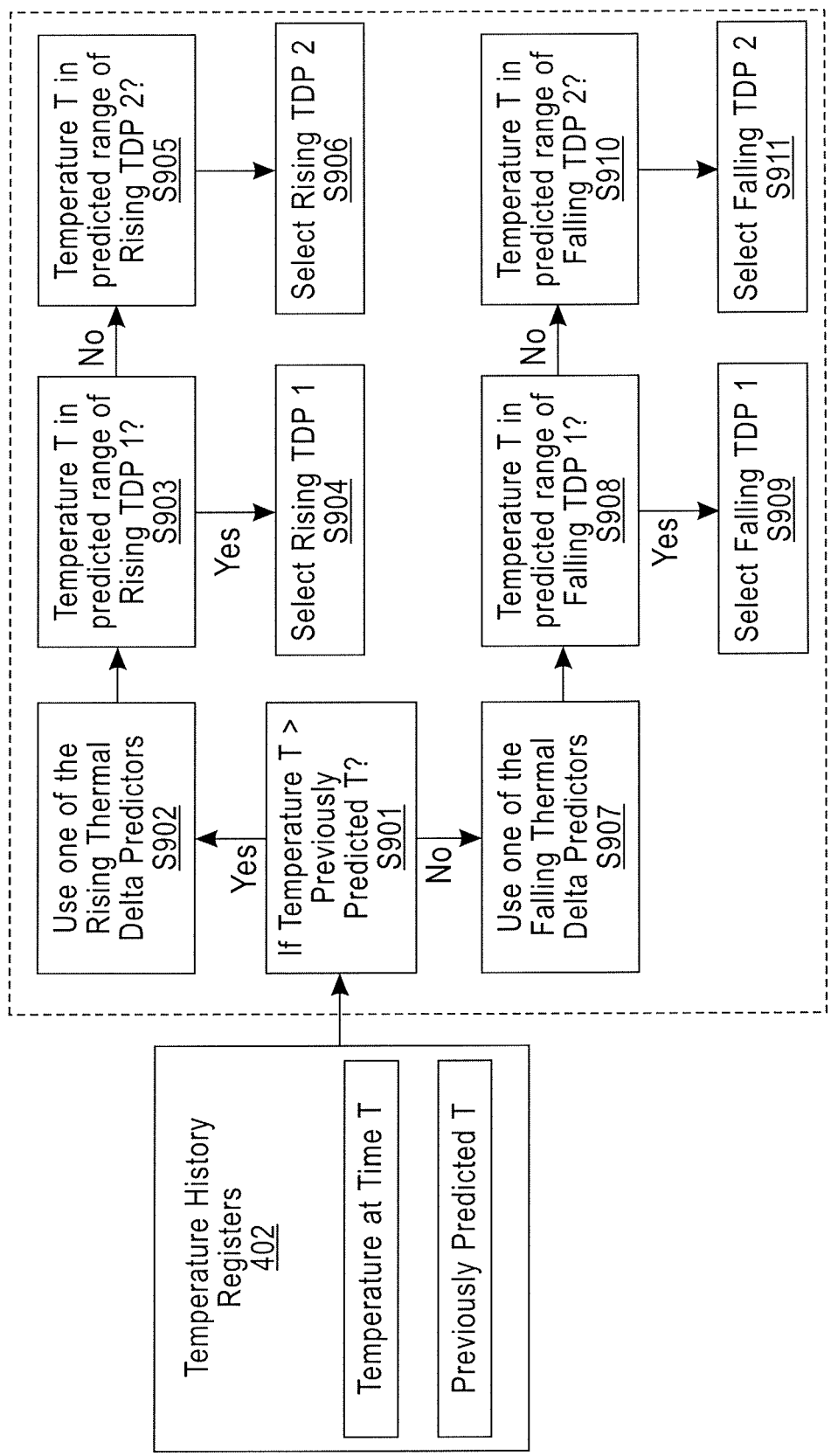
FIG. 9 illustrates a method of selecting one of the thermal delta predictors according to an exemplary embodiment of the invention.

FIG. 9 illustrates a method of the Predictor Selector 430 selecting one of the thermal deltas to arrive at the Predicted Thermal Delta 440, according to an exemplary embodiment of the invention. The method includes determining whether the Current Temperature T is greater than the previously Predicted Temperature (S901).

If the Current Temperature T is greater than the previously Predicted Temperature (e.g., a predicted future temperature), the method decides to use one of the Rising Thermal Delta Predictors 421 and 422 (S902). Then, the method determines whether the Current Temperature T is within the first temperature range of the first Rising Thermal Delta Predictor 421 (S903). If the Current Temperature T is within the first temperature range, the method selects the first Rising Thermal Delta Predictor 421 (S904). If the Current Temperature T is not within the first temperature range, the method determines whether the Current Temperature T is within the second temperature range of the second Rising Thermal Delta Predictor 422 (S905). If the Current temperature T is within the second temperature range, the method selects the second Rising Thermal Delta Predictor 422 (S906). For example, if the previously Predicted Temperature is 64° C., the current temperature T is 65° C., the first temperature range is 63-68° C., the second temperature range is 68-72° C., the first Rising Thermal Delta Predictor 421 predicts an increase of 5° C., the second Rising Thermal Delta Predictor 422 predicts an increase of 6° C., then the first Rising Thermal Delta Predictor 421 would be selected, and accordingly, the Predicted Thermal Delta 440 would be 5° C. For example, if the idle temperature is 60° C., then the Predicted Temperature 450 would be 65° C.

If the Current Temperature T is less than the Previously Predicted Temperature T, the method decides to use one of the Falling Thermal Delta Predictors 423 and 424 (S907). Then, the method determines whether the Current Temperature T is within the third temperature range of the second Rising Thermal Delta Predictor 423 (S908). If the Current Temperature T is within the third temperature range, the method selects the first Falling Thermal Delta Predictor 423 (S909). If the Current Temperature T is not within the third temperature range, the method determines whether the Current Temperature T is within the fourth temperature range of the second Falling Thermal Delta Predictor 424 (S910). If the Current Temperature T is within the fourth temperature range, the method selects the second Falling Thermal Delta Predictor 424 (S911). For example, if the Previously Predicted Temperature T is 65° C., the Current Temperature T is 64° C., the third temperature range is 68-72° C., the fourth temperature range is 63-68° C., the second Falling Thermal Delta Predictor 424 predicts a thermal delta of 2° C., the first Falling Thermal Delta Predictor 423 predicts a thermal delta of 3° C., then the second Falling Thermal Delta Predictor 424 would be selected, and accordingly, the Predicted Thermal Delta 440 would be 2° C. For example, if the idle temperature is 60° C., then the Predicted Temperature 450 would be 62° C. The Predicted Temperature 450 illustrated in FIG. 4 and generated from a prior iteration may be stored in one of the Temperature History Registers 402 as the Previously Predicted Temperature T for use in the method of FIG. 9.

Figure 10:
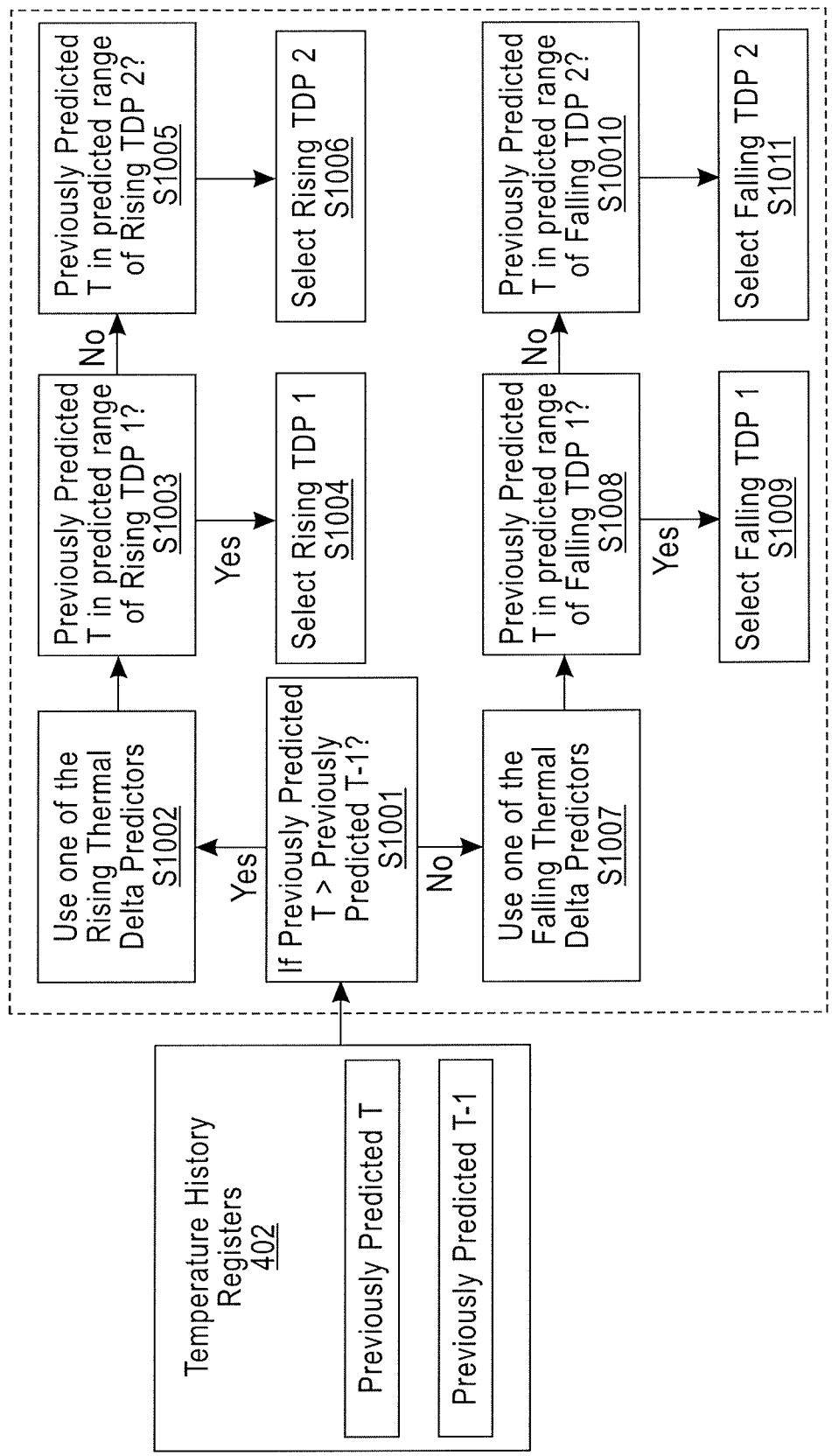
FIG. 10 illustrates a method of selecting one of the thermal delta predictors according to an exemplary embodiment of the invention.

FIG. 10 illustrates a method of the Predictor Selector 430 selecting one of the thermal deltas to arrive at the Predicted Thermal Delta 440, according to an exemplary embodiment of the invention. The method includes determining whether the most recent Previously Predicted Temperature T is greater than the next most recent Previously Predicted Temperature T−1 (S1001).

If the most recent Previously Predicted Temperature T is greater than the next most recent Previously Predicted Temperature T−1, the method decides to use one of the Rising Thermal Delta Predictors 421 and 422 (S1002). Then, the method determines whether the most recent Previously Predicted Temperature T is within the first temperature range of the first Rising Thermal Delta Predictor 421 (S1003). If the most recent Previously Predicted Temperature T is within the first temperature range, the method selects the first Rising Thermal Delta Predictor 421 (S1004). If the most recent Previously Predicted Temperature T is not within the first temperature range, the method determines whether the most recent Previously Predicted Temperature T is within the second temperature range of the second Rising Thermal Delta Predictor 422 (S1005). If the most recent Previously Predicted Temperature T is within the second temperature range, the method selects the second Rising Thermal Delta Predictor 422 (S1006). For example, if the next most recent Previously Predicted Temperature is 64° C., the most recent Previously Predicted Temperature T is 65° C., the first temperature range is 63-68° C., the second temperature range is 68-72° C., the first Rising Thermal Delta Predictor 421 predicts an increase of 5° C., the second Rising Thermal Delta Predictor 422 predicts an increase of 6° C., then the first Rising Thermal Delta Predictor 421 would be selected, and accordingly, the Predicted Thermal Delta 440 would be 5° C. For example, if the idle temperature is 60° C., then the Predicted Temperature 450 would be 65° C.

If the most recent Previously Predicted Temperature T is less than the next most recent Previously Predicted Temperature T−1, the method decides to use one of the Falling Thermal Delta Predictors 423 and 424 (S1007). Then, the method determines whether the most recent Previously Predicted Temperature T is within the third temperature range of the second Rising Thermal Delta Predictor 423 (S1008). If the most recent Previously Predicted Temperature T is within the third temperature range, the method selects the first Falling Thermal Delta Predictor 423 (S1009). If the most recent Previously Predicted Temperature T is not within the third temperature range, the method determines whether the most recent Previously Predicted Temperature T is within the fourth temperature range of the second Falling Thermal Delta Predictor 424 (S1010). If the most recent Previously Predicted Temperature T is within the fourth temperature range, the method selects the second Falling Thermal Delta Predictor 424 (S1011). For example, if the next most recent Previously Predicted Temperature T is 65° C., the most recent Previously Predicted Temperature T is 64° C., the third temperature range is 68-72° C., the fourth temperature range is 63-68° C., the second Falling Thermal Delta Predictor 424 predicts a thermal delta of 2° C., the first Falling Thermal Delta Predictor 423 predicts a thermal delta of 3° C., then the second Falling Thermal Delta Predictor 424 would be selected, and accordingly, the Predicted Thermal Delta 440 would be 2° C. For example, if the idle temperature is 60° C., then the Predicted Temperature 450 would be 62° C. The Predicted Temperature 450 illustrated in FIG. 4 and generated from a two prior iterations may be stored in the Temperature History Registers 402 as the next most recent Previously Predicted Temperature T−1 and the most recent Previously Predicted Temperature T for use in the method of FIG. 10.

In an embodiment, the first Rising Thermal Delta Predictor 421 predicts temperatures lower than the second Rising Thermal Delta Predictor 422, for the same inputs. This relationship may extend to more than two Rising Thermal Delta Predictors if needed. In an exemplary embodiment, the first Rising Thermal Predictor 421 predicts ⅔ of the positive thermal delta (from 0 to ⅔ of peak), and the second Rising Thermal Delta Predictor 422 predicts the remaining ⅓ (from ⅔ of peak to the peak).

In an embodiment, the first Falling Thermal Delta Predictor 423 predicts temperatures higher than the second Falling Thermal Predictor 424, for the same inputs. This relationship may extend to more than two Falling Thermal Delta Predictors if needed. In an embodiment, the first Falling Thermal Delta Predictor predicts ⅔ of the negative thermal delta (from 0 to ⅔ of bottom), and the second Thermal Delta Predictor 424 predicts the remaining ⅓ (from ⅔ of bottom to the bottom).

In an embodiment, the library 270 includes an entry for each of a plurality of tasks, and each entry additionally includes a predicted utilization from the hardware counters 210 based on the last values predicted or profiled, to fill up a k-entry HC History in FIG. 5 with the same values. Each entry may additionally include a predicted temperature, which may be stored in one or more predicted temperature registers among register 230. The processing unit 16 or the micro-controller 250 may include logic (e.g., a task selector) to fill the predicted temperature registers with the transient thermal prediction for each task. The predictions may be made with the same flow as FIG. 4, but with hardware counters from the library 270. The task selector may select a task that has a lower temperature than a currently executed task. Other scheduling criteria such as task priority and fairness may be considered as well.

While the above disclosure refers to an embodiment of the invention that uses 2 rising thermal delta predictors and 2 falling delta predictors, the invention is not limited thereto. For example, there may be one or more additional rising thermal delta predictors and/or one or more additional falling thermal delta predictors. For example, if linear regression performed on the temperature data and hardware counter data shown in FIG. 3 has revealed the presence of a fifth intermediate line between lines 301 and 302 of a fifth intermediate slope, and a sixth intermediate line between lines 303 and 304 of a sixth intermediate second slope, a third rising thermal detector could be generated from the fifth intermediate line, and a third falling thermal detector could be generated from the sixth intermediate line. Then step S701 of FIG. 7 would compute the minimum value from among the three rising thermal detectors and step S704 of FIG. 7 would compute the maximum value from among the three falling thermal detectors. The method of FIG. 8 could be modified in a similar manner to use the three rising thermal detectors and the three falling detectors.

In an exemplary embodiment, each of the thermal predictors 420 is based on a different linear function to generate corresponding linear predictors. However, in an alternate embodiment, one or more of the thermal predictors 420 is instead based on an exponential function or a quadratic function. For example, if an analysis of the temperature and hardware counter data reveal that a given quadratic function better models two portions of the data, while linear functions best models two other portions of the data, then two of the thermal predictors would be based on quadratic functions and the other two thermal predictors would be based on linear functions. In another embodiment, one or more of the thermal predictors 420 are neural network predictors.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An integrated circuit (IC) comprising:
a plurality of hardware performance counters;
a thermal sensor; and
a micro-controller,
wherein the micro-controller generates a plurality of thermal predictors based on values of the counters and temperatures sensed by the thermal sensor, the thermal predictors comprising first and second rising thermal delta predictors to predict rising temperature deltas and first and second falling thermal delta predictors to predict falling temperature deltas,
wherein the micro-controller predicts a future temperature of the IC based on an idle temperature of the IC and a selected one of the temperature deltas, and
wherein the micro-controller performs an action to prevent an internal temperature of the IC from reaching the predicted future temperature, when the predicted future temperature exceeds a threshold temperature,
wherein the predicted future temperature is a temperature at which the IC experiences a temporary malfunction or a permanent failure when the predicted future temperature exceeds the threshold temperature.

2. The IC of claim 1, wherein the future temperature is a sum of the idle temperature and the selected one temperature delta.

3. The IC of claim 1, wherein each thermal delta predictor is based on a different linear function.

4. The IC of claim 3, wherein each linear function is derived from performing a linear regression on points representing a temperature sensed by the thermal sensor and a count performed by at least one of the hardware counters when the temperature was sensed.

5. The IC of claim 3, wherein the first rising thermal predictor is based on a first linear function having a first slope, the second rising thermal predictor is based on a second linear function having second slope, the first falling thermal predictor is based on a third linear function having a third slope, and the second falling thermal predictor is based on a fourth linear function having a fourth slope, wherein the first slope is steeper than the second slope, and wherein the third slope is steeper than the fourth slope.

6. The IC of claim 1, wherein each thermal delta predictor comprises a first weight multiplied by a first count of a first one of the hardware counters added to a second weight multiplied by a second counter of a second other one of the hardware counters.

7. The IC of claim 6, wherein the temperature delta of a corresponding one of the thermal delta predictors is generated by recording values of the two counters during a given period, generating a first sum from the recorded values of the first counter, a second sum from the record values of the second counter, setting the first count to the first sum, and setting the second count to the second sum.

8. The IC of claim 1, wherein the micro-controller selects the one temperature delta by:
   operating the rising thermal delta predictors to generate first values; and
   selecting a minimum of the first values as the selected one temperature delta when the minimum is greater than or equal to a temperature difference sensed by the thermal sensor.

9. The IC of claim 8, further comprising:
   operating the falling thermal delta predictors to generate second values when the minimum is less than the temperature difference; and
   selecting a maximum of the second values as the selected one temperature delta.

10. The IC of claim 1, wherein the micro-controller selects the one temperature delta by:
    determining whether the internal temperature sensed by the thermal sensor is greater than a previous temperature sensed by the thermal sensor or a previously predicted future temperature;
    operating one of the rising thermal delta predictors to generate a value when the internal temperature is determined to be greater than the previous temperature or the previously predicted future temperature; and
    operating one of the falling thermal delta predictors to generate the one temperature delta when the internal temperature is determined to be less than the previous temperature or the previously predicted future temperature.

11. The IC of claim 10, wherein operating one of the rising thermal delta predictors comprises:
    determining which of a first temperature range and second temperature range, internal temperature sensed by the thermal sensor fits within;
    operating the first rising thermal delta predictor to generate the one temperature delta when the internal temperature fits within the first temperature range; and
    operating the second rising thermal delta predictor to generate the one temperature delta when the internal temperature fits within the second temperature range.

12. The IC of claim 10, wherein operating one of the falling thermal delta predictors comprises:
    determining which of a first temperature range and second temperature range, a the internal temperature sensed by the thermal sensor fits within;
    operating the first falling thermal delta predictor to generate the one temperature delta when the internal temperature fits within the first temperature range; and
    operating the second falling thermal delta predictor to generate the one temperature delta when the internal temperature fits within the second temperature range.

13. The IC of claim 1, wherein the micro-controller performs the action by throttling a central processing unit (CPU) of the IC.

14. The IC of claim 13, wherein the micro-controller throttles the CPU by reducing an operating frequency of the CPU.

15. The IC of claim 1, wherein the micro-controller performs the action by directing that a central processing unit of the IC switch from executing a first task to executing a second task.

16. The IC of claim 1, wherein one of the thermal delta predictors is based on an exponential function or a quadratic function.

17. The IC of claim 1, wherein the micro-controller performs the action by increasing a priority of a first task and decreasing a priority of a second task.

18. A method of predicting a future temperature within an integrated circuit (IC) to prevent a temporary malfunction or a permanent failure of the IC, comprising:
    generating, first and second rising thermal delta predictors, based on values of hardware counters of the IC and temperatures sensed by a thermal sensor within the IC, to predict rising temperature deltas;
    generating, first and second falling thermal delta predictors, based on values of hardware counters of the IC and temperatures sensed by the thermal sensor within the IC, to predict falling temperature deltas;
    predicting the future temperature based on an idle temperature of the IC and a selected one of the temperature deltas; and
    performing an action to prevent an internal temperature of the IC from reaching the predicted future temperature, when the predicted future temperature exceeds a threshold temperature,
    wherein the predicted future temperature is a temperature at which the IC experience the temporary malfunction or the permanent failure when the predicted future temperature exceeds the threshold temperature.

19. The method of claim 18, wherein each thermal delta predictor is based on a different linear function.

20. The method of claim 19, wherein each linear function is derived from performing a linear regression on points representing the internal temperature sensed by the thermal sensor and a count performed by at least one of the hardware counters when the temperature was sensed.

* * * * *